(12) United States Patent
Schulz et al.

(10) Patent No.: US 6,819,316 B2
(45) Date of Patent: Nov. 16, 2004

(54) FLEXIBLE CAPACITIVE TOUCH SENSOR

(75) Inventors: Stephen C. Schulz, Tewksbury, MA (US); Anthony F. Chernefsky, Dracut, MA (US); Bernard Geaghan, Salem, NH (US)

(73) Assignee: 3M Innovative Properties Company, St. Paul, MN (US)

( * ) Notice: Subject to any disclaimer, the term of this patent is extended or adjusted under 35 U.S.C. 154(b) by 372 days.

(21) Appl. No.: 09/836,634

(22) Filed: Apr. 17, 2001

(65) Prior Publication Data

US 2002/0149572 A1 Oct. 17, 2002

(51) Int. Cl.[7] .................................................. G09G 5/00
(52) U.S. Cl. ..................... 345/174; 345/178; 345/179; 178/18.01; 178/18.06; 178/18.05; 178/18.07
(58) Field of Search ................................ 345/173–183; 463/37–38; 178/18.01–18.11, 19.01–19.07; 438/444, 445, 428, 384, 780; 428/447, 327, 429

(56) References Cited

U.S. PATENT DOCUMENTS

| 4,017,848 | A | * | 4/1977 | Tannas, Jr. ............... 340/365 R |
| 4,198,539 | A | | 4/1980 | Pepper, Jr. |
| 4,293,734 | A | | 10/1981 | Pepper, Jr. |
| 4,371,746 | A | | 2/1983 | Pepper, Jr. |
| 4,622,437 | A | | 11/1986 | Bloom et al. |
| 4,686,332 | A | | 8/1987 | Greanias et al. |
| 4,707,570 | A | * | 11/1987 | Ide et al. ....................... 178/18 |
| 4,731,508 | A | | 3/1988 | Gibson et al. |
| 4,816,811 | A | | 3/1989 | Bogatin et al. |
| 4,931,782 | A | | 6/1990 | Jackson |
| 5,045,644 | A | | 9/1991 | Dunthorn |
| 5,062,916 | A | | 11/1991 | Aufderheide et al. |
| 5,159,159 | A | | 10/1992 | Asher |
| 5,386,219 | A | | 1/1995 | Greanias et al. |
| 5,432,671 | A | | 7/1995 | Allavena |
| 5,466,895 | A | | 11/1995 | Logan |
| 5,543,588 | A | | 8/1996 | Bisset et al. |
| 5,650,597 | A | | 7/1997 | Redmayne |
| 5,738,934 | A | | 4/1998 | Jones |
| 5,739,180 | A | | 4/1998 | Taylor-Smith |
| 5,844,175 | A | | 12/1998 | Nakanishi et al. |
| 5,859,392 | A | * | 1/1999 | Petty ........................ 178/18.01 |
| 5,861,583 | A | | 1/1999 | Schediwy et al. |
| 5,886,687 | A | | 3/1999 | Gibson |
| 5,940,065 | A | * | 8/1999 | Babb et al. .................. 345/178 |
| 5,948,851 | A | | 9/1999 | Anton et al. |
| 6,058,485 | A | * | 5/2000 | Koziuk et al. ............... 713/320 |
| 6,118,433 | A | * | 9/2000 | Jenkin et al. ................ 345/173 |
| 6,469,267 | B1 | * | 10/2002 | Welsh et al. ................. 345/173 |
| 6,587,097 | B1 | * | 7/2003 | Aufderheide et al. ........ 345/173 |

FOREIGN PATENT DOCUMENTS

| EP | 0917291 | 5/1999 |
| WO | WO 9213328 | 8/1992 |

OTHER PUBLICATIONS

Gregory P. Crawford, "A Bright New Page in Portable Displays," IEEE Spectrum, Oct., 2000, pp. 40–46.

(List continued on next page.)

Primary Examiner—Lun-Yi Lao
(74) Attorney, Agent, or Firm—Robert J. Pechman

(57) ABSTRACT

A flexible, capacitive touch sensor, and a method of manufacturing a plurality of such touch sensors, are provided. The capacitive touch sensor comprises a thin, flexible, transparent, insulating substrate. A thin, flexible, transparent layer of resistive material is applied to one side of the substrate, and a thin, flexible, transparent, pressure-sensitive layer of adhesive material is applied to the substrate's other side. A releasable sheet may cover this adhesive layer. A plurality of thin, flexible electrodes, electrical leads and conductive areas are applied to the resistive layer. A thin, flexible, transparent layer of protective material protects the touch sensor's active touch area. Compounds may be added to this protective layer to enhance its conductivity and lubricity. A reel-to-reel process for manufacturing a plurality of such capacitive touch sensors also is described.

20 Claims, 7 Drawing Sheets

OTHER PUBLICATIONS

Pui Wing Tam, "Wireless Telephones Shed Keypads to Make Way for Bigger Screens," The Wall Street Journal, Jan. 11, 2001, pp. B1, B6.

Kimber Lynn Z. Drake, "Capacitive Proximity Sensors Come of Age," Rockwell Automation, www.ab.com, copyright 2000 Rockwell International Corporation.

TouchPad™ Family, Synaptics, Inc. copyright 2000.

ClearPad™ Technology, Synaptics, Inc. copyright 2000.

Jack Robertson, "U.S. Trailing Japan in OLED Race," www.ebnews.com, Feb. 4, 2000.

Darran R. Cairns, et al., "Mechanical Studies of Indium Tin Oxide Thin Films on Polymer Substrates for Displays," Brown University, Jan. 5, 2001.

Motofumi Watanabe et al., "Plastic LCD for Mobile Application," IDW, 1999, pp. 254–255.

M. Ikeda, et al., "Characteristics of Low–Temperature Processed a–Si TFT on Plastic Substrates," IDW, 1999, pp. 223–226.

N.D. Young, et al., "LTPS for AMLCD on Glass and Polymer Substrates," IDW, 1999, pp. 219–222.

Victor Belyaev, et al., "Fabrication of Plastic Substrates with Controlled Relief for Optical Components and Light Weight FPD," IDW, 1999, pp. 69–72.

K. Okoshi, et al., "FLC Polymer and Plastic Substrates for Use in a Large–Area Optical Shutter for 3–D TV," SID 98 Digest, copyright 1998, pp. 1135–1138.

Z. Suo, et al., "Mechanics of Rollable and Foldable Film–on Foil Electronics," Applied Physics Letters, vol. 74, No. 8, Feb. 22, 1999, pp. 1177–1179.

R. Buerkle, et al., "Bistable FLC and Cholesteric LC Displays on Plastic Substrates for Smart–Card Applications," SID Digest, copyright 1997, pp. 109–112.

John L. West, et al., "Multi–Color, Cholesteric Displays Using Plastic Substrates," IDW, 1999, pp. 335–338.

G. M. Podojil, et al., "Plastic VGA Reflective Cholesteric LCDs with Dynamic Drive," SId 98 Digest, copyright 1998, pp. 51–54.

C. Chiulli, et al., "Integral–Color Plastic LCD: The Ultimate Flat–Panel Display, " SID 99 Digest, copyright 1999, pp. 1054–1057.

Ernst Lueder, "Passive Matrix and MIM–driven LCDs with Plastic Substrates," IDW 1999, pp. 215–218.

P. May, "Light–Emitting Polymers: A Technology for Conformable Graphic Displays," SID 96 Digest, copyright 1996, pp. 192–195.

M. Randler, "Invited Paper: Printing Processes for the Vacuum Free Manufacture of Liquid Crystal Cells with Plastic Substrates," SID 00 Digest, copyright 2000, pp. 266–269.

N.M. Kalkhoran, "Late–News Poster: Luminescence Study of Ion–Implanted $ZnGa_2O_4$ Thin Films on Flexible Organic Substrates," SID 97 Digest, copyright 1997, pp. 623–626.

R. Baeuerle, et al., "A MIM–Driven Transmissive Display with Color Filters on 2–in.–Diagonal Plastic Substrates," SID 99 Digest, copyright 1999, pp. 14–17.

S.K. Park, "Development of a Chip Bonding Technology for Plastic Film LCDs," SID 00 Digest, copyright 2000, pp. 270–273.

A. Stein, "High–Temperature Acrylic Plastic Substrates: Thermal, Chemical, and Mechanical Properties," SID 97 Digest, copyright 1997, pp. 817–820.

M. Fahland, "High–Rate Deposition of Clear and Hard Oxide Coatings on Plastic Films and Sheets," SID 98 Digest, copyright 1998, pp. 1095–1098.

P.Y.Z. Chu, "A New Conductor Structure for Plastic LCD Applications Utilizing 'All Dry' Digital Laser Patterning, " SID 98 Digest, copyright 1998, pp. 1099–1101.

Jayco MMI ClearSwitch Touchscreens, www.jaycommi.com.

Design Guide 103 Dynaclear™ Touch Screen Resistive Type, Dynapro Thin Film Products Inc. product brochure.

Resistive Touch Screen Construction, www.saltkorea.com, copyright 1998.

Dynapro ET 4500 Computer, 3M Dynapro Products, www.dynapro.com.

Near Field Imaging™ Touch Screen System, 3M Dynapro Products, www.dynapro.com.

Dynaclear™ Resistive Touch Screen System, 3M Dynapro Products, www.dynapro.com.

Richard A. Quinnell, "Touchscreen Technology," www.ednmag.com, Nov. 9, 1995.

"Acrylate Chemistry, General Guidelines."

Stephen Schultz, "Touch Screen Technology," Vacuum & Thinfilm, Jan. 1999, pp. 22–27.

Touch Sensor Technologies, www.hyubjin.co.kr.

Darran R. Cairns, "Electrical Studies of Mechanically Deformed Indium Tin Oxide Coated Polymer Substrates," SID 00 Digest, copyright 2000, pp. 274–277.

* cited by examiner

WORK ORDER # 81 82 83 84 85 86 87 88

FLEXIBLE CAPACITIVE TOUCH SENSOR

TECHNICAL FIELD

This invention relates to touch sensors and, in particular, to capacitive touch sensors and to a method of manufacturing capacitive touch sensors.

BACKGROUND OF THE INVENTION

Touch sensors are widely used to provide a user-friendly interface to a computer system. The sensor usually is affixed over the computer system's monitor to enable the user to directly interact with the system through the monitor by means of finger-touch or a stylus.

Touch sensors fall into two broad categories, namely, digital touch sensors and analog touch sensors. The touch surface of a digital touch sensor is segregated into a plurality of discrete segments. Each of these segments produces a discrete signal when touched. Sensing resolution is limited, therefore, to identifying the particular segment contacted by a finger or stylus. The signal from an analog touch sensor, on the other hand, is not discrete. Sensing resolution is limited only by the overall sensitivity of the sensor and its controlling electronics.

Both analog and digital touch sensors employ a variety of techniques to determine the point at which a finger or stylus contacts the touch surface. These techniques include resistive sensing, capacitive sensing, acoustic sensing and optical sensing. The vast majority of touch sensors, however, use either resistive sensing or capacitive sensing techniques.

A resistive touch sensor employs a flexible membrane positioned over a substrate. The opposing surfaces of the membrane and substrate are coated with a transparent conductive film. Insulating dot spacers are interposed between the membrane and the substrate. When the flexible membrane is pressed by a user, the conductive film of the membrane contacts the conductive film of the substrate. This contact causes current to flow between the membrane and substrate. A controller identifies the point of contact by comparing the current flowing from various electrodes or busbars printed on the conductive surfaces.

A capacitive touch sensor employs no moving parts. In a capacitive touch sensor, a resistive coating is deposited directly upon a solid, insulating substrate. This substrate usually is made of glass. Electrodes positioned at the corners of the substrate establish an electrical field on the coating. A controller connected to these electrodes monitors the amount of current flowing through each of these electrodes. A user's finger, or a conductive stylus, touching, or coming within close proximity to, the resistive coating causes capacitive coupling between the finger or stylus and the coating. This coupling causes a small amount of current to flow through the coating and each of the electrodes. Capacitive coupling through the user's body and ground complete the current path back to the controller. The controller calculates the Cartesian coordinates, i.e., the X and Y coordinates, of the point of touching from the amount of current flowing through each of these electrodes.

Capacitive touch sensors also can function to detect the proximity of an object to the touch sensor. In this case, physical contact with the touch sensor is not required. Capacitive coupling occurs between the object and the sensor through the space separating the object from the sensor.

Since resistive sensors require moving parts, they are more complex and often more costly to manufacture than capacitive touch sensors. The optics of resistive touch sensors also are degraded by the sensor's multiplicity of separated layers having different refractive indices. Touch sensors located in bright environments require a low reflection touch screen to maintain display contrast. This problem is particularly acute for resistive touch sensors. Although an excessively bright display can overcome this problem, such a display requires additional electrical power and adds to the display's cost. This solution, therefore, is not desirable for a device operating on batteries.

Although analog capacitive touch sensors are less complex and provide better optics, the solid, rigid substrate used on these devices diminish their suitability for mobile computerized systems, such as laptop computers, handheld computers, cellular telephones and the like. The weight of such sensors, and their capacity for breaking, also are important factors militating against their use in such systems. Mobile devices also experience far more mechanical flexing than stationary devices. A rigid, brittle and heavy component incorporated into such a device is incompatible with light, flexible components and could cause such flexible components to fail. Similar considerations apply to displays mounted in vehicles and large displays mounted on walls. Brittle, rigid substrates also increase the thickness of a display in products for which a low profile provides a commercial advantage.

Touch sensors based on glass substrates also require a specially fitted frame for mounting the sensor over a monitor or display. Such frames further add to the weight, cost and complexity of the device. A flat, solid substrate also does not conform well to displays or monitors with uneven or curved surfaces, and bending rigid substrates requires expensive processing. Glass based touch sensors, moreover, must be manufactured from individual substrates of cut glass. Such manufacture is costly and time consuming. All of these deficiencies diminish the desirability of existing capacitive touch sensors in some applications.

SUMMARY OF THE INVENTION

The present invention overcomes many of the deficiencies of capacitive touch sensors. The present invention provides an inexpensive, light weight, flexible, transparent capacitive touch sensor and an efficient, low cost method of manufacturing such a touch sensor. Notwithstanding the low cost, light weight and flexibility of a touch sensor in accordance with the present invention, the touch sensor has an unexpectedly high durability enabling it to perform satisfactorily in numerous environments and with a wide variety of devices. The present invention also provides a thin, transparent, flexible layer of protective material to protect the active touch area of a flexible, transparent touch sensor. This protective material substantially enhances the touch sensor's performance and durability.

In one aspect, the present invention provides a flexible, capacitive touch sensor. This touch sensor comprises a thin, flexible, transparent substrate having a first side and a second side. A first layer of resistive material is applied to the first side of the substrate. This first layer is thin, transparent, electrically continuous, flexible and covers on the substrate's first side a surface coincident with an active touch area. The first layer is adapted to receive an electrical potential across the first layer within the active touch area and to transmit an electrical signal indicative of the X and Y position of a point at which an object contacts the active touch area.

The flexible, capacitive touch sensor preferably includes a plurality of thin, flexible electrodes in electrical communication with the first layer. These electrodes are positioned along the periphery of the active touch area and are adapted to apply the electrical potential. The flexible, capacitive touch sensor also preferably includes a plurality of thin, flexible, electrical leads in electrical contact with the electrodes for transmitting electrical signals to and from the electrodes. A plurality of thin, flexible, conductive areas also preferably are included on the touch sensor. The conductive areas are in electrical communication with the first layer and are positioned along the periphery of the active touch area. The conductive areas form a pattern which is adapted to linearize, within the active touch area, the electrical potential throughout the first layer applied by the electrodes.

The flexible, capacitive touch sensor preferably also comprises a second layer of protective material. Depending upon the configuration of the touch sensor, i.e., which side of the substrate corresponds to the touch sensor's active touch surface, this second layer is on either the first layer or the substrate's second side. The second layer also is thin, transparent, flexible and covers within the active touch area substantially the entire surface of either the first layer or the substrate's second side. The mechanical properties of the protective material make this second layer both flexible and durable. The second layer protects the active touch surface from wear and marring during use.

The touch sensor also may comprise a third layer of adhesive material. Again, depending upon the touch sensor's configuration, this third layer may be on either the first layer or the substrate's second side. This third layer is thin, transparent and flexible. This third layer also preferably is pressure sensitive. The adhesive material enables the touch sensor to be attached to a supporting structure or display face. The third layer preferably covers within the active touch area substantially the entire surface of either the first layer or the substrate's second side. Covering substantially this entire surface with this layer provides smooth contact with the surface to which the touch sensor is affixed. In the alternative, the adhesive material may be applied in small amounts along only the periphery of the first layer or the second side.

The third layer of adhesive material preferably comprises a releasable sheet covering the exposed surface of this layer until the flexible touch sensor is attached to a display. This display may be a flexible display.

The electrodes, leads and conductive areas may be on the first layer of resistive material or on the substrate's first side. In the latter case, the first layer of resistive material covers the electrodes, leads and conductive areas. In another embodiment, the electrodes, leads and conductive areas are on the second layer of protective material and communicate with the first layer of resistive material through capacitive coupling. This capacitive coupling may be enhanced by imparting a low level of conductivity to the protective material. In other embodiments, the leads are deposited on either the second side of the substrate or on an insulating layer along the periphery of the active touch area covering the conductive areas.

The capacitive touch sensor preferably is connected to a controller for providing the electrical potential applied across the first layer within the active touch area and for receiving the electrical signal indicative of the X and Y position of a point at which an object, e.g., a person's finger or a conductive stylus, contacts the active touch area. This controller preferably provides a further electrical signal also indicative of this X and Y position. The controller preferably is connected to the electrical leads and provides an alternating voltage to the electrodes. The controller preferably monitors the amount of current flowing through each of these electrodes and, based upon these amounts, provides the further electrical signal.

The substrate preferably is a transparent sheet of polyethylene terephthalate (PET) having a thickness of between approximately 3 mils and 9 mils. The preferred thickness is approximately 7 mils. The first layer of resistive material preferably is a layer of transparent conductive oxide, e.g., indium tin oxide (ITO), indium oxide, silicon indium oxide, aluminum zinc oxide, indium zinc oxide, antimony tin oxide or tin oxide, having a resistance of between approximately 100 ohms per square and approximately 4,000 ohms per square. This layer most preferably is ITO having a resistance of approximately 1,000 ohms per square and a thickness of between approximately 200 angstroms and 500 angstroms. In an alternative embodiment, the first layer comprises a first coating of a first resistive material in contact with the substrate's first side and a second coating of a second resistive material in contact with the first coating. The second resistive material preferably has a higher durability than the first resistive material. The first resistive material preferably is indium tin oxide, and the second resistive material preferably is tin oxide.

Conductive ink may be used for depositing the electrodes, leads and conductive areas. This conductive ink preferably is silver epoxy conductive ink. The substrate may include a tail extending from the substrate's periphery, and the electrical leads may extend over this tail. An electrical connector may be attached to the end of this tail in electrical contact with the leads.

The second layer of protective material preferably is fabricated from a resin containing organosiloxane compounds combined with fluorine or methyl groups, or combinations of these compounds, to reduce the coefficient of friction of this resin. The resin preferably is an acrylate based resin. The second layer also may contain an inorganic compound, such as silica, to increase this protective layer's resistance to abrasion. In an alternative embodiment, the second layer comprises a first coating of a first material in contact with the first layer of resistive material, and a second coating of a second material in contact with this first coating. For this embodiment, the modulus (hardness) of the first coating preferably is less than the modulus of the second coating. The first material for this embodiment may be a first polymer and the second material may be a second polymer, with the modulus of the first polymer being less than the modulus of the second polymer.

In yet another embodiment, the second layer of protective material contains a substance to impart a low level of conductivity to this layer. This substance may comprise inorganic conductive particles or intrinsically conducting polymers. For this embodiment, the second layer of protective material preferably has a resistivity of between approximately 0.1 ohms-cm. and $10^{12}$ ohms-cm. As indicated above, imparting a low level of conductivity to the second layer increases the touch signal transmitted between the resistive layer and a finger or stylus.

The second layer of protective material also may comprise a roughened surface to diffuse light reflected from this surface. To provide this roughened surface, the second layer may contain transparent or translucent particles or may be mechanically embossed. The materials comprising these particles may also be chosen to reduce the particles' coefficient of friction and enhance the particles' resistance to abrasion.

In yet another embodiment, the flexible capacitive touch sensor comprises a fourth layer of conductive material. Depending upon the touch sensor's configuration, this fourth layer may be on either the substrate's second side or on an insulating layer covering the first layer of resistive material. This fourth layer shields the touch sensor from interference from excessive electromagnetic radiation, particularly excessive radiation emitted from a display to which the sensor is attached.

In another aspect, the present invention provides a method for manufacturing a plurality of flexible, capacitive touch sensors. In accordance with this method, a thin, flexible, transparent substrate is provided. This substrate has a first side, a second side and is sufficiently large for division into a plurality of separate sections. Each of these sections corresponds to one of the capacitive touch sensors.

In accordance with this method, the substrate is passed by a plurality of processing stations, preferably by winding the substrate from a holding reel onto a receiving reel. The steps of the manufacturing process are performed at these processing stations during this process. The transmission of the substrate past these processing stations may occur one or more times. In accordance with this manufacturing process, a thin, flexible, transparent, electrically continuous first layer of resistive material is applied on the first side of the substrate. A plurality of thin, flexible electrodes, electrical leads and conductive areas are positioned on, or in communication with, the first layer of resistive material. These leads, electrodes and conductive areas are positioned along the peripheries of these sections. A thin, flexible second layer of protective material preferably is applied, depending upon the touch sensors' configuration, to either the first layer or the substrate's second side. A plurality of thin, elongated lines preferably are cut through the first layer, or through the first layer and the second layer, to substantially electrically isolate the various electrical leads from the conductive areas (except where these leads connect to the electrodes). This cutting preferably is done with a laser. The first layer, substrate and, if present, the second layer then are cut completely through, again preferably with a laser, along the peripheries of the various sections to provide the plurality of capacitive touch sensors.

This manufacturing process also may comprise applying, at one or more of the processing stations, a thin, transparent, flexible layer of adhesive material on either the first layer or the substrate's second side (again, depending upon the touch sensors' configuration). In the alternative, this layer of adhesive material may be pre-attached to the substrate before passing the substrate through the manufacturing system. The substrate preferably is a sheet of polyethylene terephthalate (PET), and the resistive material preferably is indium tin oxide (ITO). The indium tin oxide preferably is deposited by vacuum deposition, e.g., sputtering. The electrodes, leads and conductive areas preferably comprise conductive ink, most preferably silver epoxy conductive ink, and this conductive ink preferably is deposited by screen printing or ink-jet printing. The protective material preferably comprises acrylate based resin modified to increase surface lubricity, and this resin preferably is deposited by spraying or Gravure coating.

The manufacturing process also may comprise applying, at one or more of the processing stations, a layer of conductive material to shield the sensor from excessive electromagnetic radiation. Depending upon the touch sensors' configuration, this conductive layer may be applied to either the substrate's second side or to an insulating layer covering the first layer. The process also may comprise affixing a releasable sheet over the exposed surface of the adhesive material. In the alternative, the releasable sheet may be pre-attached to the adhesive material.

DETAILED DESCRIPTION OF THE PREFERRED EMBODIMENTS

Figure 1:
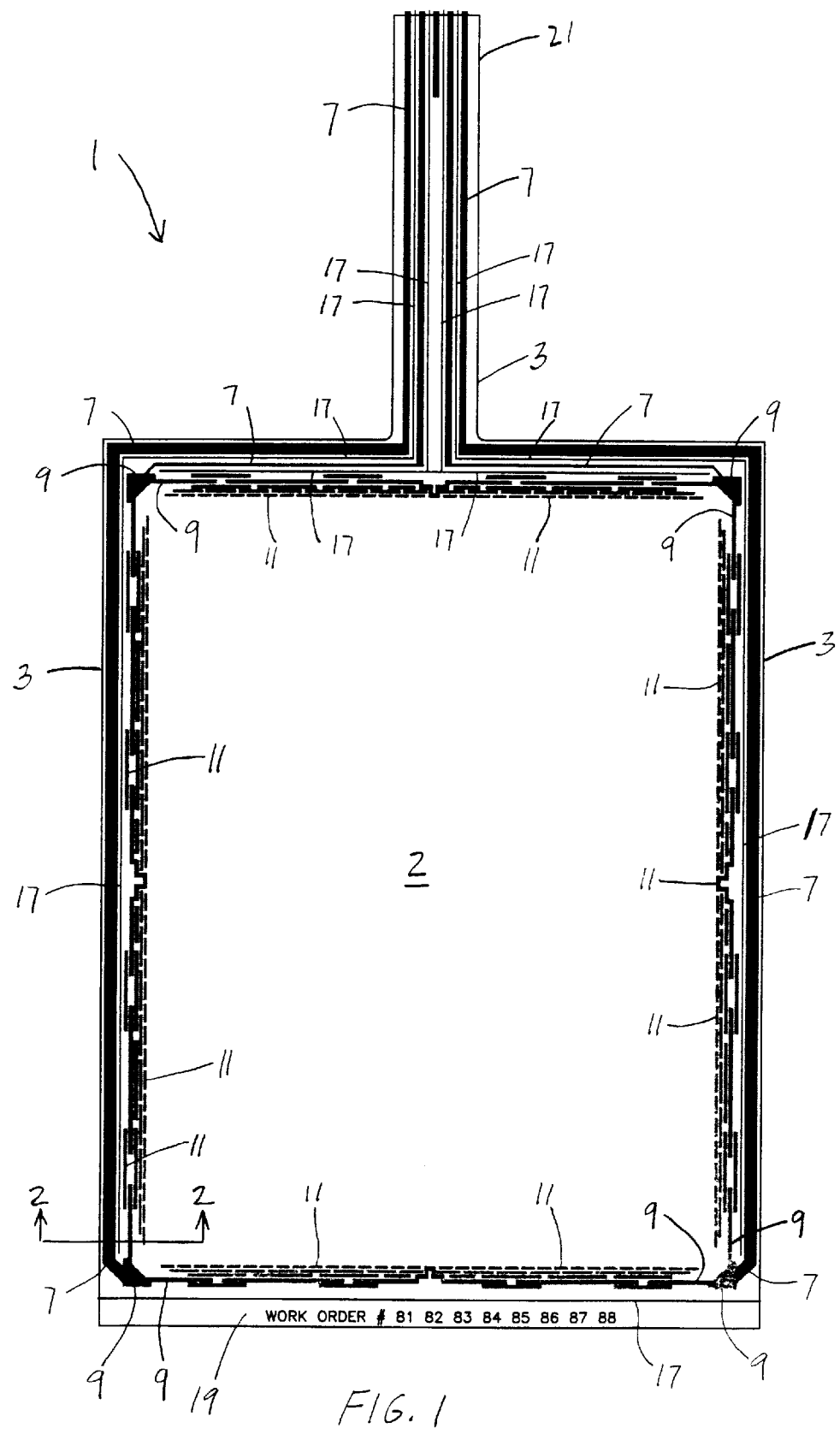
FIG. 1 is a plan view of a flexible, capacitive touch sensor in accordance with the present invention.
Figure 2:
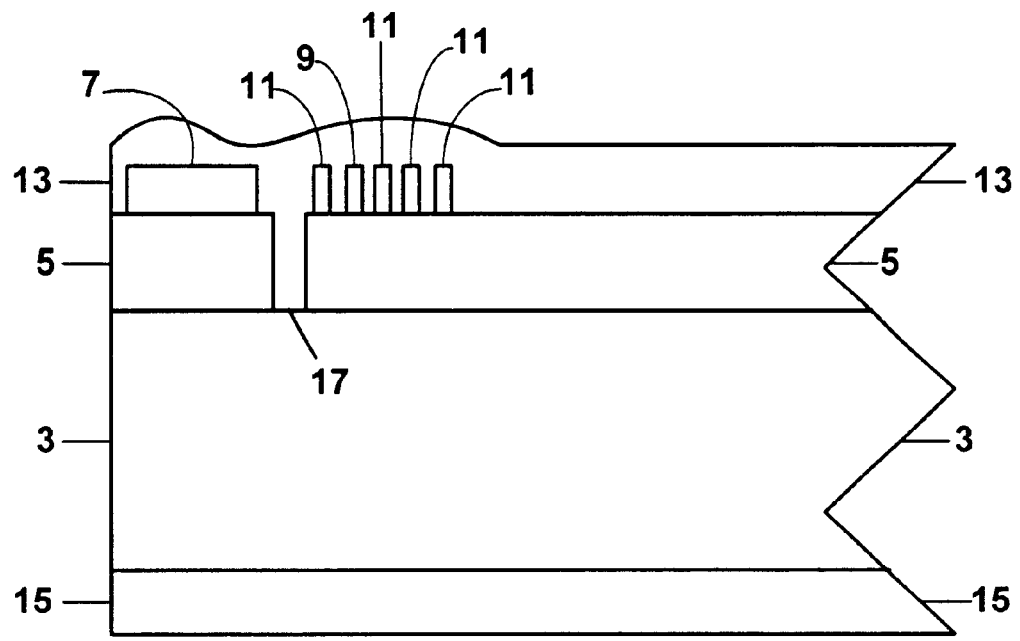
FIG. 2 is a schematic sectional view, taken along line 2—2 of FIG. 1, of the flexible, capacitive touch sensor shown in FIG. 1.

FIGS. 1 and 2 are a plan view and a schematic sectional view, respectively, of a flexible, capacitive touch sensor 1 in accordance with the present invention. When connected to an appropriate controller (not shown), touch sensor 1 detects the point at which an object, e.g., a user's finger or a conductive stylus, contacts, or comes within close proximity to, active touch area 2 of touch sensor 1. Touch sensor 1 provides a signal indicative of the Cartesian coordinates, i.e., the X and Y position, of this point of contact. Touch sensor 1 also may function to detect the proximity of an object to active area 2.

Figure 6:
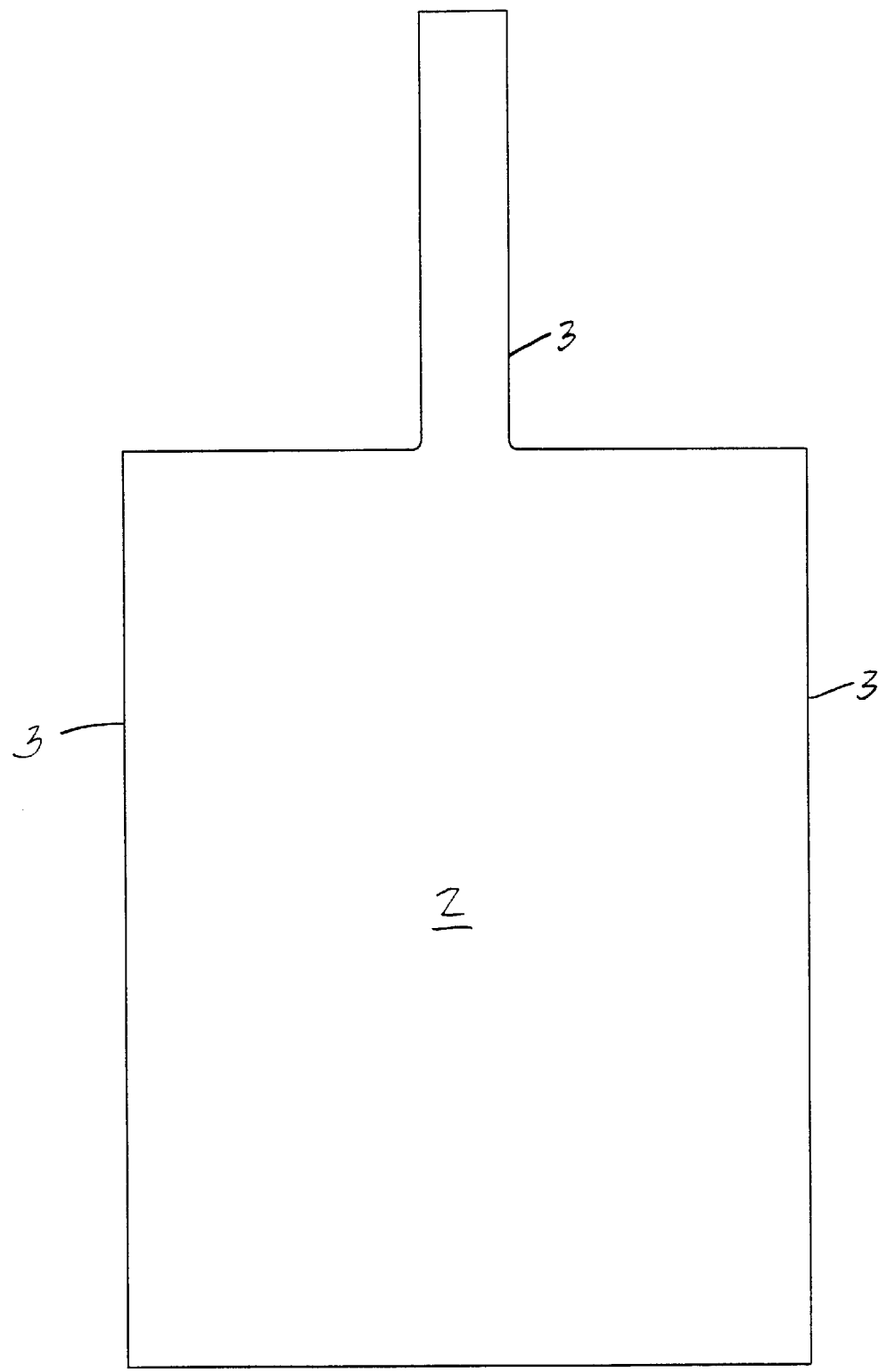
FIG. 6 is a plan view of the flexible, capacitive touch sensor of FIG. 1 showing only the substrate.

Touch sensor 1 includes a thin, flexible, transparent, insulating substrate 3. As used in this specification and in the claims, a substance or material described or recited as being "transparent" includes substances or materials which are only partially transparent, e.g., "translucent." Substrate 3, shown separately in FIG. 6, is generally rectangular in shape and has an elongated tail 21 extending from one edge. The shape of substrate 3 may be other than rectangular, however, e.g., circular, square, triangular or polygonal. Substrate 3 preferably comprises a sheet of polyethylene terephthalate (PET). In lieu of PET, substrate 3 may be a flexible sheet of another suitable material, e.g., polycarbonate polyester, polyvinyl chloride, polyether sulfone, polyimide polyether imide, cellulose triacetate and polyethelene naphthalate.

Substrate 3 preferably has a thickness of approximately 7 mils. The thickness of substrate 3 may range, however, from approximately 3 mils to approximately 15 mils. Substrate 3 more preferably has a range of between approximately 3 mils and approximately 9 mils. Substrate 3 should have a thickness which is less, however, than that which may cause the materials applied to the substrate to be excessively stressed when the substrate is flexed. On the other hand, substrate 3 should not be so thin that handling and application to a display are excessively difficult.

As shown in FIG. 2, the top side of substrate 3 is coated with a thin, transparent, flexible layer 5 of resistive material. An appropriate material for resistive layer 5 is a transparent conductive oxide, preferably indium tin oxide (ITO) In the alternative, another transparent conductive oxide which can be applied to substrate 3 at a relatively low temperature may be employed, e.g., indium oxide, silicon indium oxide, aluminum zinc oxide, indium zinc oxide, antimony tin oxide or tin oxide. Resistive layer 5 may be applied to substrate 3 through vacuum deposition, e.g., sputtering. This layer preferably has a resistance of approximately 1,000 ohms per square. The resistance of resistive layer 5 may range, however, from approximately 100 ohms per square to approximately 4,000 ohms per square.

Resistive layer 5 preferably comprises a continuous coating of material covering active area 2 of substrate 3. In the alternative, resistive layer 5 may include some discontinuities to improve the adhesion of materials applied to resistive layer 5. For example, resistive layer 5 may include a plurality of small apertures to provide direct contact between such materials and substrate 3. However, resistive layer 5 should be electrically continuous within active area 2. In other words, a path should be available within active area 2 from every point on resistive layer 5 to every other point on resistive layer 5 without crossing a boundary of this layer.

The thickness of resistive layer 5 should be as small as possible to avoid excessive stress during flexing of touch sensor 1 and to improve optical transmissivity. On the other hand, the thickness of resistive layer 5 should not be so small as to jeopardize the continuity of this layer or its material properties during manufacture. An appropriate thickness for resistive layer 5 is between approximately 200 angstroms and approximately 500 angstroms.

In order to improve the ability of resistive layer 5 to withstand flexing, scratching and chemical changes during manufacture, this layer may consist of two coatings, a first coating of resistive material and a second more durable coating of resistive material over this first coating. The first coating preferably is ITO, and the second coating preferably is tin oxide ($SnO_2$). Of course, other suitable materials may be used for this purpose.

Figure 4:
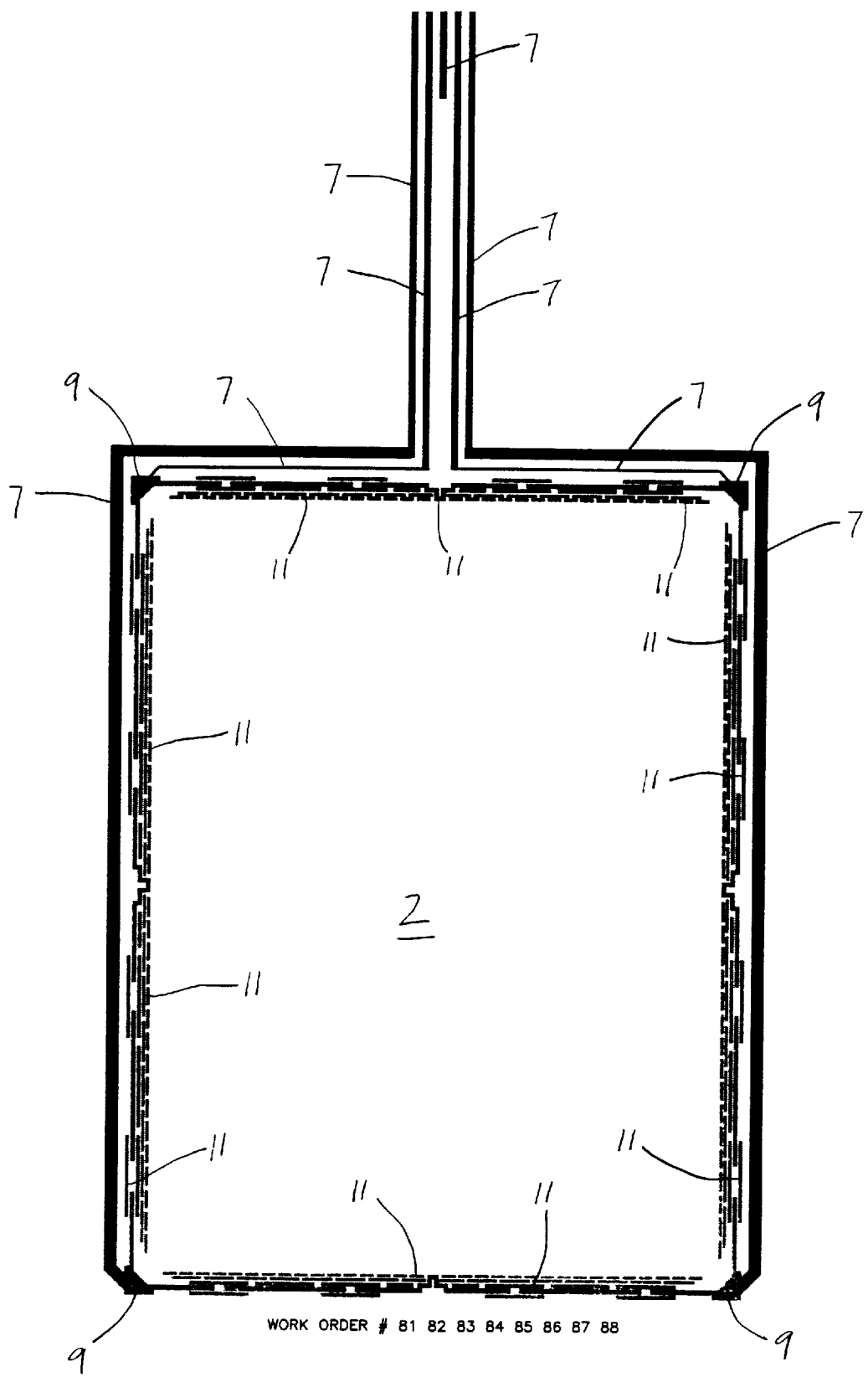
FIG. 4 is a plan view of the flexible, capacitive touch sensor of FIG. 1 showing only the electrodes, electrical leads and conductive areas.

Referring again to FIGS. 1 and 2, touch sensor 1 also includes electrodes 9 deposited on the surface of resistive layer 5 near the corners of active area 2. These electrodes are connected to electrical leads 7 and are adapted to apply an electrical potential across active area 2 within resistive layer 5. The pattern of electrodes 9, electrical leads 7 and conductive areas 11 (discussed below) deposited on resistive layer 5 is shown separately in FIG. 4.

Electrical leads 7 are deposited along the outer periphery of substrate 3 to maximize the dimensions of active area 2. These electrical leads extend from these peripheral areas over tail 21 to an electrical connector (not shown) attached to the end of tail 21. When touch sensor 1 is affixed to a display, this connector is connected to a controller for transmitting an alternating voltage to electrodes 9. An extension cable may be used for this purpose. The controller also monitors the amount of current flowing through each of these electrodes. Based upon these amounts, this controller provides a signal indicating the X and Y position at which a person's finger or a conductive stylus contacts, or comes within close proximity to, active area 2. Such a controller is described in, e.g., U.S. Pat. No. 4,353,552 (Pepper), the subject matter of which is incorporated herein by reference. Also, with an appropriate controller, touch sensor 1 also can function to detect the proximity of an object to active area 2. In such a case, physical contact with active area 2 is not required. Capacitive coupling occurs between the object and active area 2 through the space separating the object and active area 2.

Conductive areas 11 also are deposited on resistive layer 5 along the peripheries of substrate 3. Conductive areas 11 form a pattern, as is known in the art, for linearizing across active area 2 within resistive layer 5 the electrical potential produced by electrodes 9. A description of such a linearizing pattern of conductive areas is provided in, e.g., U.S. Pat. No. 4,371,746 (Pepper), the subject matter of which is incorporated herein by reference. This linearizing pattern causes the current flowing from each of electrodes 9 to correspond linearly with the distance between a given electrode and the point at which contact of active area 2 occurs. As indicated above, the pattern of these conductive areas is shown separately in FIG. 4.

Rather than deposit electrodes 9, electrical leads 7 and conductive areas 11 on resistive layer 5, electrodes 9, electrical leads 7 and conductive areas 11 may be deposited on the front side of substrate 3, and resistive layer 5 may be deposited over electrical leads 7, electrodes 9 and conductive areas 11. Also, in order to maximize the dimensions of active area 2, electrical leads 7 may be deposited on the back side of substrate 3, and these leads may be connected to electrodes 9 by a conductive material, such as conductive tape, extending around the edges of substrate 3 or through apertures in substrate 3 coated with conductive material.

In an alternative embodiment, in order to increase the dimensions of active area 2, a layer of thin, insulating material may be deposited along the periphery of substrate 3 over resistive layer 5 and conductive areas 11. Electrical leads 7 then may be deposited on this insulating layer. This insulating material also may be deposited over electrodes 9 and, if so, apertures in the insulating layer, coated with conductive ink, may be created to provide an electrical connection between electrical leads 7 and electrodes 9. The materials and methods described in U.S. Provisional Patent Application No. 60/179,874, filed on Feb. 2, 2000 and commonly assigned with the present application, may be employed for this embodiment. The subject matter of U.S. Provisional Patent Application No. 60/179,874 is incorporated herein by reference.

Electrodes 9, electrical leads 7 and conductive areas 11 consist of thin, flexible depositions of conductive ink such as, for example, thermally cured silver epoxy. This conductive ink may be deposited on substrate 3 by screen printing or ink-jet printing.

In order to enhance the appearance of touch sensor 1, and provide enhanced protection to electrodes 9, electrical leads 7 and conductive areas 11, a coating of insulating ink (not shown) may be deposited over these electrodes, leads, and conductive areas. Information about touch sensor 1, such as, e.g., a manufacturer's name, manufacture's logo, product number, etc., may be printed using different colors of such ink. Also, identification area 19 (FIG. 1) on resistive layer 5 may be used for printing identifying indicia or other information using conductive or non-conductive ink. If conductive ink is used in this area, the area should be electrically isolated from resistive layer 5 by, e.g., a laser-cut line in resistive layer 5 as discussed below.

Referring again to FIG. 2, touch sensor 1 also includes protective layer 13. This layer preferably covers substantially the entire surface of resistive layer 5, including electrodes 9, electrical leads 7 and conductive areas 11. In the alternative, protective layer 13 may cover only active area 2 or a portion of active area 2. Also, in a further alternative embodiment, electrodes 9, electrical leads 7 and conductive areas 11 may be deposited on protective layer 13. In this further alternative embodiment, electrical communication between these conductive areas and resistive layer 5 occurs through capacitive coupling. This capacitive coupling may be enhanced by imparting a low level of conductivity to protective layer 13, as discussed below.

Protective layer 13 preferably is a thin, flexible, transparent layer of resin, preferably thermally cured, acrylate based resin. In the alternative, this resin may be cured through exposure to ultra violet radiation, plasma radiation or electron beam radiation. The resin also may be chemically polymerized. The resin may be sprayed over the surface of resistive layer 5, electrodes 9, electrical leads 7 and conductive areas 11. In the alternative, this resin may be applied by pulling substrate 3 over a roller coated with the resin, as in the Gravure coating process, or deposited from a monomer source in a vacuum. Spraying is preferred, however, to avoid damage to the raised pattern of electrodes 9, electrical leads 7 and conductive areas 11 and to avoid discontinuities in protective layer 13 that may be caused by pulling substrate 3 over such a roller. In another alternative, protective layer 13 may be applied by screen-printing. Although screen-printing permits depositing protective layer 13 selectively, this technique suffers from manufacturing inefficiencies when compared to spraying or the Gravure process.

Protective layer 13 protects resistive layer 5 from damage which may result from a person's fingertips or fingernails, or coins, pens, jewelry and other implements, contacting active area 2. Protective layer 13 also serves to insulate the conductively printed areas from shorting by, for example, liquids spilled on this surface.

In order to enhance the feel and further enhance the durability of protective layer 13, and also reduce flexing stresses between this layer and resistive layer 5, compounds may be combined with, or substituted for, the base resin to enhance the lubricity of protective layer 13, i.e., to reduce this layer's coefficient of friction. These compounds may include one or more compounds of siloxane, fluorine and methyl groups. For example, coatable fluorothermoplastics such as those from Dyneon, or a fluorinated acrylate, such as 3M Fluorad™ FX-189, may be used for this purpose. In lieu of combining such compounds with the base resin, such compounds may be applied as an overcoating over a harder underlying acrylate coat or over an underlying coat of another material providing enhanced adhesion to both resistive layer 5 and the overlying coat. Protective layer 13 also may be entirely formulated from organosiloxane compounds, e.g., silicone, or compounds containing organosiloxanes, fluorocarbons or combinations of these compounds. In order to further enhance the ability of protective layer 13 to withstand abrasion, inorganic compounds, such as silica, may be added to the base resin either alone or in combination with the above-identified compounds for enhancing lubricity.

In an alternative embodiment, protective layer 13 comprises two layers. The first layer is in contact with resistive layer 5 and is softer than the second layer which covers the first layer and is exposed to the environment. The modulus of the first layer, therefore, is less than the modulus of the second layer. This alternative embodiment reduces stresses between resistive layer 5 and protective layer 13 during flexing and, therefore, diminishes the extent to which stress fractures may occur in resistive layer 5 as a result of flexing.

Such a bi-layered structure for protective layer 13 may be obtained by fabricating this layer from two polymers, each with a different degree of hardness. The modulus of the polymer forming the outer layer should be higher than the modulus of the polymer forming the inner layer. Additional layers also may be employed in such a structure to cause the degree of hardness of the polymers forming protective layer 13 to increase progressively from resistive layer 5 to the surface of protective layer 13.

In order to further avoid fractures in resistive layer 5 caused by stress in resistive layer 5, resistive layer 5 may be positioned at the neutral stress plane of substrate 3, resistive layer 5 and protective layer 13.

Since capacitive coupling occurs between protective layer 13 and resistive layer 5, protective layer 13 is preferably thin to enhance the efficiency of capacitive coupling. The appropriate thickness of protective layer 13 depends in part, however, upon the dielectric constant of this layer. An appropriate thickness for protective layer 13 providing both satisfactory protection and capacitive coupling in most cases is between approximately 1 micron and approximately 5 microns.

The thickness of protective layer 13 and the magnitude of coupling between this layer and resistive layer 5, can be increased, however, by adding to the materials used for formulating protective layer 13 substances to impart a low level of conductivity to these materials. These substances include inorganic conductive particles, such as conductive oxide powder. In the alternative, protective layer 13 can be formulated to include intrinsically conducting polymers, such as polyaniline, polypyrrole, polythiophene, polyacetylene, polyphenylene vinylene, polyphenylene sulfide, poly p-phenylene and polyheterocycle vinylene. The resistivity of protective layer 13, the reciprocal of conductivity, generally should range from approximately 0.1 ohm-cm to approximately $10^{12}$ ohm-cm.

Protective layer 13 also may have a roughened surface to reduce reflected light and glare. This roughened surface can be produced by mixing transparent particles with the acrylate based resin or other material forming this layer. These particles can be chosen to improve the abrasion or scratch resistance of the composite protective layer. For example, choosing particles comprised of either organosiloxane compounds, fluorocarbon compounds or combinations of these compounds can yield a surface having a lower coefficient of friction and improved durability. A mixture of organic and inorganic compounds also can be used for this purpose. These particles may protrude from protective layer 13 to provide a lubricious contact surface for this layer. In the alternative, protective layer 13 can be mechanically embossed to produce such a surface, provided the embossing process does not damage resistive layer 5. A roughened surface also can be produced by selectively controlling the form, size and viscosity of the droplets of resin or other material sprayed onto resistive layer 5 to form protective layer 13.

The features and properties of protective layer 13 may be employed to construct a protective layer for the active touch area of a touch sensor employing sensing technologies or structures other than those described above for touch sensor 1. For example, a protective layer employing one or more of these features or properties may be employed to construct a protective layer for protecting the active touch area of a flexible touch sensor employing the structure or touch-sensing technologies described in, for example, U.S. Pat. Nos. 5,650,597; 4,686,332 or 4,931,782, the subject matter of which are incorporated herein by reference.

Figure 5:
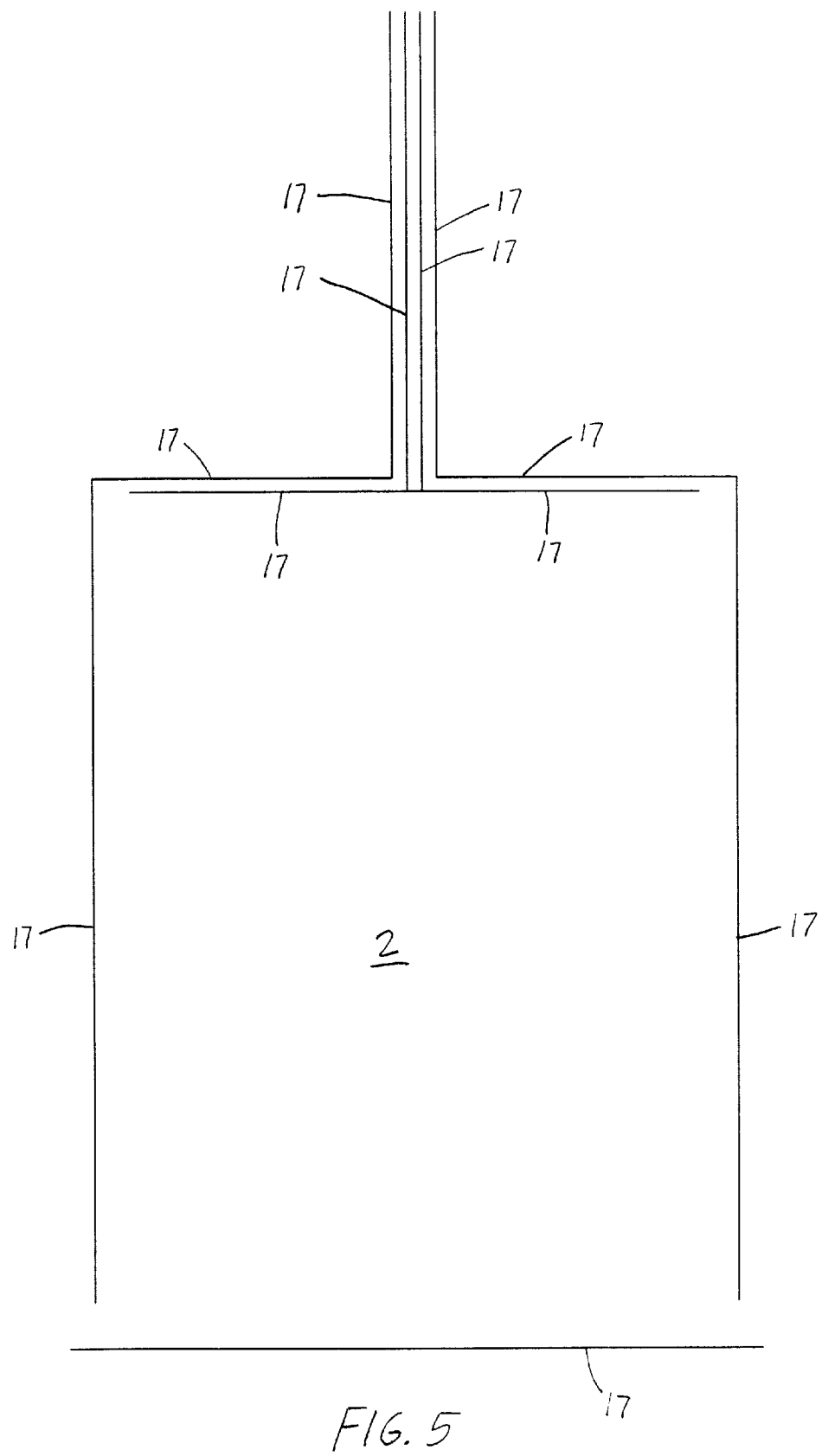
FIG. 5 is a plan view of the flexible, capacitive touch sensor of FIG. 1 showing only the laser cuts in the resistive layer.

Electrical leads 7 should be electrically isolated from conductive areas 11 to avoid the signals on these leads interfering with the linearized electrical potential across resistive layer 5 produced by electrodes 9 and conductive areas 11. Such electrical isolation may be produced by cutting thin lines 17 within resistive layer 5, as shown in FIG. 1. The pattern of these lines is shown separately in FIG. 5. As discussed above, if the identifying indicia in identification area 19 are printed with conductive ink, a line 17 also should be cut in resistive layer 5 to isolate this area. Lines 17 preferably are cut with a laser. In the alternative, lines 17 may be cut using chemical or mechanical etching.

Referring to FIG. 2, touch sensor 1 also may include adhesive layer 15 on the bottom of substrate 3. Adhesive layer 15 preferably is a thin, transparent, flexible, pressure-sensitive layer of adhesive material which covers substantially the entire bottom surface of substrate 3. For applications requiring frequent replacement of touch sensor 1 on a display or other device, or applications which do not benefit significantly from full surface optical lamination, adhesive layer 15 may be applied only to the periphery of the substrate's back side. A releasable sheet (not shown) may cover the exposed surface of adhesive layer 15 to facilitate the storage and transport of touch sensor 1. Adhesive layer 15 enables touch sensor 1 to be easily affixed to the surface of an active display, e.g., the display of a cellular telephone, personal digital assistant (PDA) or portable computer, or to an inactive display, e.g., a poster, voting card or other printed material. Of course, prior to such affixing, this releasable sheet is removed.

Figure 3:
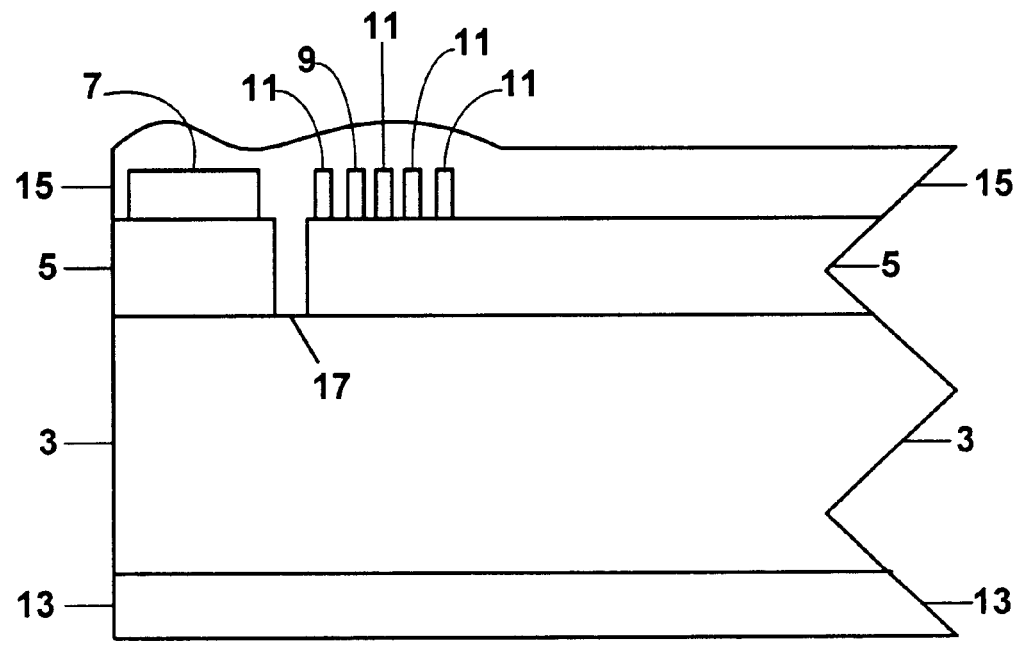
FIG. 3 is a schematic sectional view of an alternative embodiment of a flexible, capacitive touch sensor in accordance with the present invention.

An alternative embodiment for touch sensor 1 is shown in FIG. 3. In this embodiment, the bottom side of substrate 3 is the touch surface. As shown in this figure, adhesive layer 15 covers resistive layer 5, electrodes 9, electrical leads 7 and conductive areas 11. Protective layer 13, on the other hand, covers the bottom side of substrate 3 to protect this touch surface. In this embodiment, therefore, the positions of adhesive layer 15 and protective layer 13 are reversed. Since contact occurs from the bottom side of substrate 3, both protective layer 13 and substrate 3 protect resistive layer 5, electrodes 9, electrical leads 7 and conductive areas 11 from damage from, e.g., fingertips, instruments, etc. In this embodiment, however, the magnitude of capacitive coupling between resistive layer 5 and, e.g., a person's fingertip or a conductive stylus, through protective layer 13 and substrate 3 is diminished. Therefore, the signal transmitted to the controller as a result of contacting protective layer 13 has a lower amplitude. This capacitive coupling may be enhanced, however, by imparting a low level of conductivity to substrate 3 and to protective layer 13. This embodiment nevertheless may be less desirable in environments producing a low signal-to-noise ratio or with controllers having a low sensitivity. This embodiment also makes the addition of a back-side shielding layer, discussed below, somewhat less efficient.

In order to enhance the signal-to-noise ratio when using touch sensor 1 on a display transmitting a large degree of noise, a shielding layer of conductive material (not shown) may be applied to the back side of substrate 3 before applying adhesive layer 15. This conductive material serves to shield touch sensor 1 from noisy signals transmitted from the display. The material used for this shielding layer may be similar to that used for resistive layer 5 but should have a lower sheet resistance. Like the material used for resistive layer 5, this shielding layer also should be thin, transparent and flexible.

As indicated above, in the embodiment of FIG. 2, the shielding layer is placed between substrate 3 and adhesive layer 15. In the embodiment of FIG. 3, however, an insulating layer first must be applied over resistive layer 5, electrodes 9, electrical leads 7 and conductive areas 11, and the shielding layer then is applied over this insulating layer. Adhesive layer 15 then is applied over the shielding layer.

Figure 7:
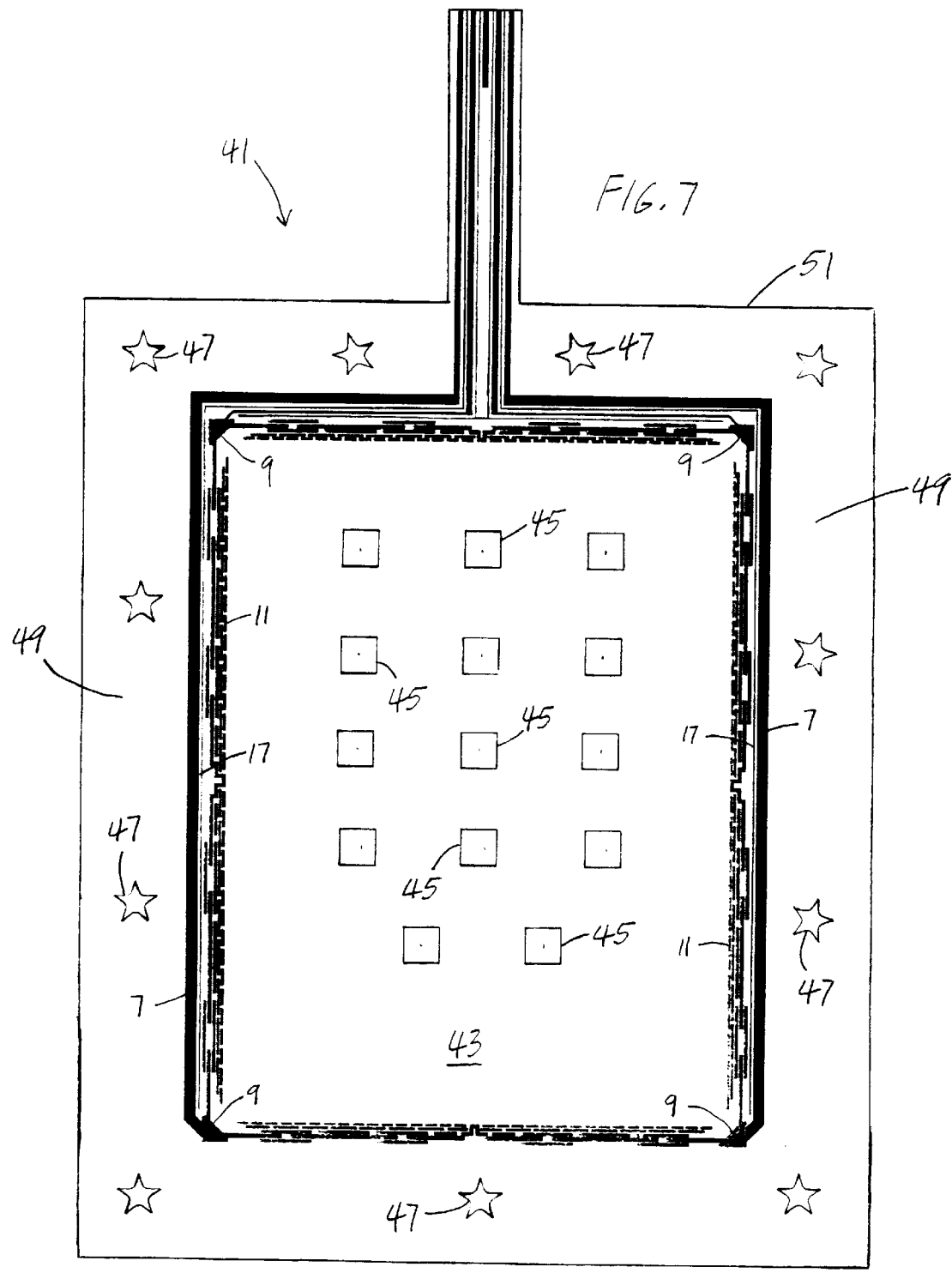
FIG. 7 is a plan view of an alternative embodiment of a flexible, capacitive touch sensor in accordance with the present invention.

FIG. 7 illustrates a further alternative embodiment for a flexible capacitive touch sensor 41 in accordance with the present invention. In this embodiment, border area 49 of substrate 51 extends substantially beyond active touch area 43 of touch sensor 41. Decorative graphics 47 or information, e.g., information about, or instructions for, touch sensor 41 or the display or other device to which touch sensor 41 is applied or connected, may be printed within border area 49. Non-conductive ink preferably is used for such printing. If border area 49 is electrically isolated from active area 43, however, conductive ink also may be used for this purpose.

As shown in FIG. 7, graphics, such as buttons 45, or alphanumeric information also may be printed on substrate 51 within active area 43. To avoid electrical interference with active area 43, non-conductive ink normally should be used for this purpose. This printing may be on substrate 51 or, in the alternative, on the resistive or protective layers of active area 43.

Electrical leads 7 are shown in FIG. 7 along the periphery of active area 43. Electrical leads 7, however, may be positioned within border area 49, e.g., along the periphery of substrate 51. Such positioning may facilitate manufacturing of touch sensor 41.

A system and method for manufacturing a plurality of flexible, capacitive touch sensors having the structure of any of the embodiments described above are schematically illustrated in FIG. 8. As shown in this figure, a long sheet 33 of a substrate material, such as PET, is rolled from reel 23 onto reel 25, or vice versa, during this manufacturing process. In lieu of reels 23 and 25, other means may be employed for distributing sheet 33 through the manufacturing stations of FIG. 8, e.g., a first receptacle from which sheet 33 is unfolded and a second receptacle into which sheet 33 is folded.

Figure 9:
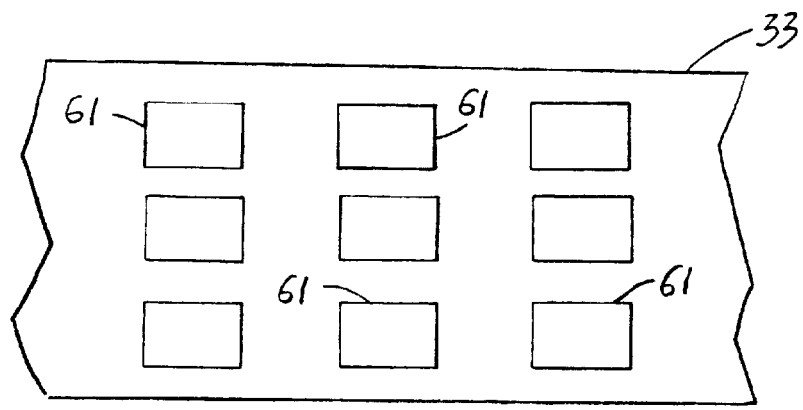
FIG. 9 is a schematic diagram of a sheet of substrate material for use in manufacturing flexible, capacitive touch sensors in accordance with the manufacturing system illustrated in FIG. 8.

Sheet 33 is illustrated in FIG. 9. The dimensions of sheet 33 are sufficiently large for the division of this sheet into a plurality of separate sections 61. Each of these sections corresponds to one touch sensor. During the manufacturing process, processing stations, such as processing stations 27, 29 and 31, apply to sheet 33 the various layers of material, and perform the various processing steps, necessary to fabricate the embodiments of a flexible, capacitive touch sensor described above. These steps can be performed during one pass of sheet 33 between reel 23 and reel 25 or during a series of such passes.

For example, these manufacturing steps may include: (1) depositing a layer of thin, flexible, transparent resistive material on the top of sheet 33; (2) depositing for each of the sections a plurality of thin, flexible electrodes on the resistive material; (3) depositing for each of the sections a plurality of thin, flexible electrical leads on the resistive material; (4) depositing for each of the sections a plurality of thin, flexible conductive areas on the resistive material; (5) depositing a layer of thin, flexible, transparent protective material over the resistive material, electrodes, leads and conductive areas; (6) cutting elongated lines through the resistive layer, or through both the resistive layer and protective layer, at various locations for each of the sections to substantially electrically isolate the conductive areas from the electrical leads (except where these leads connect to the electrodes); and (7) cutting through the protective layer, resistive layer and substrate along the peripheries of each of the sections to provide the plurality of flexible, capacitive touch sensors.

Figure 8:
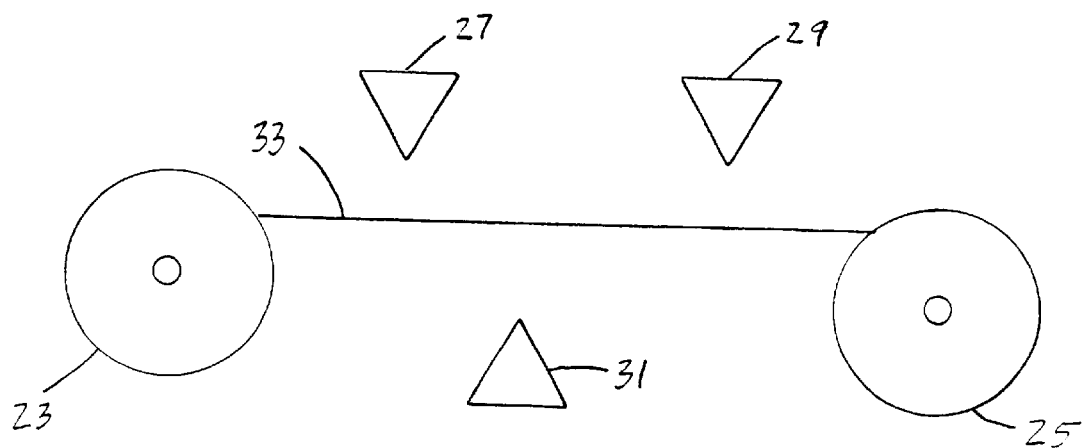
FIG. 8 is a schematic diagram of a manufacturing system for manufacturing flexible, capacitive touch sensors in accordance with the present invention.

Sheet 33 can be provided with both an adhesive layer and a releasable sheet pre-attached to this adhesive layer before sheet 33 is passed through the manufacturing steps illustrated in FIG. 8. In the alternative, an adhesive layer and releasable sheet may be applied to sheet 33 as additional steps in this manufacturing process.

The reel-to-reel manufacturing process described above enables the efficient, low-cost manufacture of a plurality of inexpensive, flexible, capacitive touch sensors having a multiplicity of possible uses. One such use is the application of the touch sensor to a flexible active display, e.g., a flexible cholesteric liquid crystal display (LCD), a reflective twisted nematic LCD, a Gyricon display, an organic light emitting diode (OLED) display or an electrophoretic display. Another such use is the application of the touch sensor to a flexible passive display, e.g., a graphics poster. Flexible, capacitive touch sensors manufactured in accordance with the present invention are inexpensive, highly durable, and can perform satisfactorily in numerous environments and with a wide variety of devices.

Although the invention has been described with reference to particular embodiments, it should be understood that these embodiments are merely illustrative of the principles and applications of the present invention. It also should be understood that numerous modifications may be made to these illustrative embodiments without departing from the spirit and scope of the present invention as defined by the following claims.

What is claimed is:

1. A method of manufacturing a plurality of flexible, capacitive touch sensors, comprising:

providing a thin, flexible, transparent substrate, said substrate having a first side, a second side and being sufficiently large for division into a plurality of separate sections, each of said sections corresponding to one of said capacitive touch sensors;

causing said substrate to pass a plurality of processing stations;

applying at one or more of said processing stations a first layer of resistive material on said first side, said first layer being thin, transparent, electrically continuous and flexible;

applying at one or more of said processing stations a plurality of thin, flexible electrodes in electrical communication with said first layer, said electrodes being positioned along the peripheries of each said section and adapted to apply within each said section an electrical potential across the portion of said first layer corresponding to said section;

applying at one or more of said processing stations a plurality of thin, flexible, electrical leads in electrical contact with said electrodes for transmitting electrical signals to and from said electrodes, said electrical leads being positioned along the peripheries of each said section;

applying at one or more of said processing stations a plurality of thin, flexible conductive areas in electrical communication with said first layer, said conductive areas being positioned along the peripheries of each said section and forming a pattern adapted to linearize within each said section the electrical potential across the portion of said first layer corresponding to said section; and cutting at one or more of said processing stations through said first layer and said substrate along the peripheries of each said section to provide said plurality of capacitive touch sensors.

2. A method of manufacturing a plurality of flexible, capacitive touch sensors as in claim 1, further comprising:

applying at one or more of said processing stations a second layer of protective material on one of said first layer and said second side, said second layer being thin, transparent, flexible and covering within each of said sections substantially the entire surface of one of said first layer and said second side; and cutting at one or more of said processing stations thin, elongated lines in said first layer along the peripheries of each said section between said conductive areas and said electrical leads to substantially electrically isolate along said peripheries said conductive areas from said electrical leads.

3. A method of manufacturing a plurality of flexible, capacitive touch sensors as in claim 1, wherein said protective material comprises one or more compounds selected from the group consisting of organosiloxanes and fluorocarbons to reduce the coefficient of friction of said protective material.

4. A method of manufacturing a plurality of flexible, capacitive touch sensors as in claim 2, wherein said second layer is deposited by spraying.

5. A method of manufacturing a plurality of flexible capacitive touch sensors as in claim 2, wherein said second layer is deposited by Gravure coating.

6. A method of manufacturing a plurality of flexible, capacitive touch sensors as in claim 2, wherein said cutting of said thin, elongated lines is effected by a laser.

7. A method of manufacturing a plurality of flexible, capacitive touch sensors as in claim 1, wherein said first layer is continuous.

8. A method of manufacturing a plurality of flexible, capacitive touch sensors as in claim 1, wherein said causing said substrate to pass said plurality of processing stations comprises winding said substrate from a holding reel onto a receiving reel.

9. A method of manufacturing a plurality of flexible, capacitive touch sensors as in claim 1, further comprising applying at one or more of said processing stations a third layer of adhesive material on one of said second side and said first layer, said adhesive material being thin, transparent and flexible.

10. A method of manufacturing a plurality of flexible, capacitive touch sensors as in claim 9, wherein said third layer is pressure sensitive and covers within each of said sections substantially the entire surface of one of said second side and said first layer.

11. A method of manufacturing a plurality of flexible, capacitive touch sensors as in claim 9, further comprising applying at one or more of said processing stations a releasable sheet over the exposed surface of said third layer.

12. A method of manufacturing a plurality of flexible, capacitive touch sensors as in claim 1, wherein said substrate is a sheet of material selected from the group consisting of polyethylene terephthalate, polycarbonate polyester, polyvinyl chloride, polyether sulfone, polyimide, polyether imide, cellulose triacetate and polyethylene naphthalate.

13. A method of manufacturing a plurality of flexible, capacitive touch sensors as in claim 1, wherein said resistive material is a transparent conductive oxide selected from the group consisting of indium tin oxide, indium oxide, silicon indium oxide, aluminum zinc oxide, indium zinc oxide, antimony tin oxide and tin oxide.

14. A method of manufacturing a plurality of flexible, capacitive touch sensors as in claim 1, wherein said resistive material is indium tin oxide.

15. A method of manufacturing a plurality of flexible, capacitive touch sensors as in claim 1, wherein said first layer is deposited by sputtering.

16. A method of manufacturing a plurality of flexible, capacitive touch sensors as in claim 1, wherein said electrodes, said leads and said conductive areas comprise conductive ink.

17. A method of manufacturing a plurality of flexible, capacitive touch sensors as in claim 16, wherein said electrodes, said leads and said conductive areas are deposited by screen printing.

18. A method of manufacturing a plurality of flexible, capacitive touch sensors as in claim 16, wherein said electrodes, said leads and said conductive areas are deposited by ink-jet printing.

19. A method of manufacturing a plurality of flexible, capacitive touch sensors as in claim 1, further comprising applying at one or more of said processing stations a fourth layer of conductive material on said second side, said fourth layer being thin, continuous, flexible, transparent and covering within each of said sections substantially the entire surface of said second side.

20. A method of manufacturing a plurality of flexible, capacitive touch sensors as in claim 1, wherein said cutting through said first layer and said substrate is effected by a laser.

* * * * *

UNITED STATES PATENT AND TRADEMARK OFFICE
CERTIFICATE OF CORRECTION

PATENT NO. : 6,819,316 B2
DATED : November 16, 2004
INVENTOR(S) : Schulz, Stephen C.

It is certified that error appears in the above-identified patent and that said Letters Patent is hereby corrected as shown below:

Title page,
Item [56], References Cited, OTHER PUBLICATIONS, "Z. Suo et al." reference insert -- - -- following "on", "R. Buerkle" reference insert -- 97 -- following "SID", "G. M. Podojil" reference delete "SId" and insert -- SID --, therefor.

Column 7,
Line 9, insert -- . -- following "(ITO)"

Column 14,
Line 25, delete "claim 1" and insert -- claim 2 --, therefor.

Signed and Sealed this

Twenty-fourth Day of May, 2005

JON W. DUDAS
*Director of the United States Patent and Trademark Office*